United States Patent [19]

Kircher et al.

[11] Patent Number: 5,400,877
[45] Date of Patent: Mar. 28, 1995

[54] TWO-TUBE SHOCK ABSORBER

[75] Inventors: Dieter Kircher, Dortelweil; Ronald Bayer, Mühlheim/M.; Siegfried Halat; Diogenes Perez, both of Frankfurt am Main; Stefan Sparschuh, Saulheim, all of Germany

[73] Assignee: Alfred Teves GmbH, Germany

[21] Appl. No.: 117,168

[22] PCT Filed: Mar. 10, 1992

[86] PCT No.: PCT/EP92/00519
§ 371 Date: Sep. 13, 1993
§ 102(e) Date: Sep. 13, 1993

[87] PCT Pub. No.: WO92/16771
PCT Pub. Date: Oct. 1, 1992

[30] Foreign Application Priority Data

Mar. 13, 1991 [DE] Germany ............ 41 08 026.2

[51] Int. Cl.[6] .............. B60G 17/08; B60G 13/08; F16F 9/46
[52] U.S. Cl. ................. 188/299; 188/322.14
[58] Field of Search .......... 188/299, 322.14, 322.15, 188/322.13, 280, 281, 282, 318, 319, 315, 314, 316, 317, 318, 313; 280/707, 714

[56] References Cited

U.S. PATENT DOCUMENTS

| | | | |
|---|---|---|---|
| 4,031,989 | 6/1977 | Blazquez | 188/315 |
| 4,597,411 | 7/1986 | Lizell | 188/322.14 X |
| 4,638,896 | 1/1987 | Poyser | 188/299 |
| 4,650,042 | 3/1987 | Knecht et al. | 188/313 X |
| 4,917,222 | 4/1990 | Bacardit | 188/299 X |
| 4,973,854 | 11/1990 | Hummel | 188/322.14 |
| 5,004,079 | 4/1991 | Ivers et al. | |

FOREIGN PATENT DOCUMENTS

| | | | |
|---|---|---|---|
| 3631714 | 4/1988 | Germany. | |
| 3-37439 | 2/1991 | Japan | 188/299 |
| 4-19435 | 1/1992 | Japan | 188/322.14 |
| 2234041 | 1/1991 | United Kingdom | 188/318 |
| WO8909891 | 10/1989 | WIPO. | |

Primary Examiner—Douglas C. Butler
Attorney, Agent, or Firm—Robert P. Seitter; J. Gordon Lewis

[57] ABSTRACT

A two-tube shock absorber for automotive vehicles is furnished with a shock absorber piston and an electromagnetically actuatable unidirectional shock absorber valve to adjust a "smooth" characteristic which is desired for enhancing driving comfort. The shock absorber valve is alternatively configured in the shape of a single-stage, or a two-stage slide valve. The position of the slide depends on the hydraulic pressure differential which decreases above the shock absorber valve, the volumetric stream which flows through the shock absorber valve, and the actuating current of the electromagnetic actuating unit. The inventive shock absorber allows the selection of a special characteristic curve out of a family of potential characteristic curves. Simultaneously, the sensitivity of the shock absorber to errors of the electromagnetic actuation is eliminated.

5 Claims, 4 Drawing Sheets

TWO-TUBE SHOCK ABSORBER

This application is based on international application no. PCT/EP 92/00519 filed on Mar. 10, 1992.

BACKGROUND OF THE INVENTION

This invention is related to a two-tube shock absorber with controllable variable shock absorbing power, and more particularly to a two-tube shock absorber for automotive vehicles, that includes a power cylinder whose interior space is subdivided by means of a piston being slidable by a piston rod into a first and a second power chamber; a storage tank, being partly filled with oil, with hydraulic connections which provides a balance of volume between the power chambers and the storage tank; a first and a second non-return valve; and an electromagnetically actuatable shock absorber valve for the variation of the cross-sectional area of flow of one of the hydraulic connections.

A two-tube shock absorber is known from the international patent application, No. WO 89/09891. The particular feature of that two-tube shock absorber consists in that its shock absorbing power is predetermined exclusively by means of a two-stage controllable shock absorber valve which is positioned at the lower end of the central tube and through which the flow is passed in one direction only. In that configuration, the pilot control stage of the shock absorber valve serves exclusively for the actuation of the main stage whose switching condition determines the variable shock absorbing power.

However, the control technique incorporated in the prior-art shock absorber includes the drawback based on the circumstance that the electric control signal for the actuation of the shock absorber valve is proportional to the desired shock absorbing power. This results from the application of so-called overpressure valves leading to a family of characteristic curves that do not encompass the range of operation required for a semiactive shock absorber. It is, furthermore, considered another disadvantage that in the event of each zero passage of the piston speed a sudden change of the shock absorbing power takes place. In addition, it is of disadvantage that for the generation of a predetermined desired characteristic curve, during a shock absorber stroke, the actuation of the pilot control stage continually must be changed. This process is highly time-dependent and can, therefore, be realized only with elevated design efforts. This circumstance leads to the fact that each time delay in the actuation of the valve unfavorably affects the chassis control process.

It is, therefore, an object of the present invention to provide a two-tube shock absorber that overcomes the aforementioned disadvantages. Moreover, a two-tube shock absorber, in accordance with this invention, affords an adjustment of a special desired characteristic curve; of the dependence of the shock absorbing power on the piston speed. The desired characteristic can be chosen out of a family of potential characteristic curves which includes progressive and degressive characteristics. Simultaneously, the sensitivity of the shock absorber with respect to actuating errors is to be eliminated.

SUMMARY OF THE INVENTION

According to this invention, the above described objects are achieved in that the shock absorber valve is preferably configured in the shape of a single-stage slide valve. The position of the slide being determined depending on the hydraulic pressure differential decreasing above the shock absorber valve, the volumetric stream flowing through the shock absorber valve, and the actuating current of the electromagnetic actuating unit.

A second embodiment of this invention which is particularly expedient in a shock absorber whose shock absorber valve is configured two-stage and includes a pilot control stage and a main stage, preferably has the hydraulic resistance of the main stage determined by the pressure differential which decreases at the shock absorber valve and the actuating current of the electromagnetic actuation. The pilot control stage and the main stage are configured in the shape of slide valves and the hydraulic resistance of the main stage is additionally determined by the volumetric stream flowing through the shock absorber valve.

A shock absorber according to this invention provides the following advantages.

In the range of low shock absorber speeds and low shock absorbing power levels, the inventive shock absorber allows the spring suspension comfort to be dosed with more precision.

In the event the actuating unit fails, the shock absorber will remain operative as a passive shock absorber. In a preferred embodiment one of the potential characteristic curves will be preselected as the passive characteristic of the shock absorber in the event of the actuation missing or failing.

In contrast to the power-controlled shock absorber, a shock absorber controlled by the performance characteristics is insensitive to malfunctions of the actuating unit, such as, for example, signal operating times or digitizing errors.

By an expedient shaping of the individual characteristic curves any change of the position of the shock absorber valve is necessary only in the event of a change of the excitation conditions such as rippling or undulation of the roadway or driving situation. Contrary to this, a power actuation of the shock absorber must react to any change of the shock absorber speed.

The advantages offered by the performance characteristics-control are independent of whether a one-tube shock absorber or a two-tube shock absorber is used, whether the shock absorber valves are disposed in the shock absorber piston or in the bottom of the shock absorber or outside the shock absorber, and whether one or a plurality of bidirectional valves are used or whether the flow of oil is influenced by different valves depending on the traction phase or on the thrust phase of the shock absorber or whether the volumetric stream of oil is equidirectional and is conveyed through one and the same valve in both phases.

One embodiment of a two-tube shock absorber, whose second non-return valve is furnished with a disc-shaped element provided with hydraulic ducts, includes a slide valve having a cylindrical guide element which is axially abutted against said disc-shaped element and which forms a sealing seat and a valve slide which is guided on said guide element and which is actuatable electromagnetically.

In such an embodiment, the valve slide is preferably configured sleeve-shaped and jointly with a winding disposed on it forming a plunger coil which interacts with an axially polarized permanent magnet. The plunger coil provides a valve that presents a favorable dynamic behavior.

In a further preferred embodiment of this invention, a favorable bunching of the lines of force of the field of force generated by the permanent magnet, which is important in view of the functioning, is achieved in that the permanent magnet is arranged between a pole shoe and a baseplate being abutted against the bottom of the shock absorber. The pole shoe is configured in the shape of a perforated disc accommodating the plunger coil and the valve slide interacting with a spring which takes support at said baseplate.

In the latter configuration the valve slide is prestressed by the spring in the direction of the sealing seat, so that the shock absorber valve is in the closed condition in the de-energized condition of the coil.

According to another embodiment of this invention, the valve slide is captivated to the baseplate by means of said spring, whereby the shock absorber valve is partly opened in the de-energized condition of the winding.

In a further advantageous embodiment of this invention the valve slide presents an annular surface which is subject to the hydraulic pressure existing in the central tube. The position of the valve slide, which is primarily adjusted by the spring and by the magnetic drive, can also be influenced by the hydraulic pressure decreasing at the shock absorber valve.

Another embodiment of the inventive shock absorber includes a two-stage shock absorber valve having the main stage and the pilot control stage arranged within a valve housing so as to be separated from the second non-return valve. The main stage is constituted by a main slide valve which is provided with at least one control edge and which interacts with flow-off bores being configured in the valve housing. The pilot control state is constituted by a control slide valve which interacts with control bores being configured in the valve housing. The performance characteristics of the main stage can be influenced by the size and by the geometric shape of the flow-off bores. The main slide valve is preferably furnished with two control edges. The first control edge being formed by the line of intersection of an annular surface defining said main slide valve with its cylindrical surface. The second control edge being defined by the lower boundary of a radial annular groove which is configurated in the main slide valve and which is connected to the interior space of said main slide valve, being open in its upper part, through radial openings which allow to be brought into connection with second flow-off bores being configurated axially beneath the aforesaid flow-off bores.

In another embodiment of this invention, the position of rest of the main slide valve is attained in that said main slide valve is prestressed in the closing direction of the main stage by means of a first compression spring and is captivated to the valve housing.

In another advantageous embodiment of the inventive shock absorber, the main slide valve is provided with restricting bores which, on one hand, end up in its interior space and, on the other hand, in a hydraulic chamber which is defined by the main slide valve within the valve housing. Such a configuration provides a smooth oil supply of the pilot control stage and functionally important pressure drops in the event of the flow passing through the restricting bores.

A particularly advantageous embodiment of this invention, whose pilot control stage is actuatable electromagnetically by a plunger coil which interacts with a permanent magnet, includes a control slide valve having a cylindrical extension of the plunger coil support guided within the valve housing, which said extension is abutted in the position of rest against the valve housing under the prestressing action of a second compression spring.

According to another preferred embodiment the actuating unit includes a plunger coil and permanent magnet accommodated within a hydraulic chamber in connection with the storage tank, so that the end of a captivating element retaining the main slide valve which projects through the entire valve housing is subject to the effect of the pressure existing in the storage tank. The aim achieved in this manner is that the plunger coil is subjected only to the pressure existing in the storage tank, whereby it is attained that simultaneously the action of a downwardly directed force is brought to bear on the captivating element.

Further details, features and advantages of this invention will be revealed by the following description of two preferred embodiments making reference to the accompanying drawings.

Figure 1:
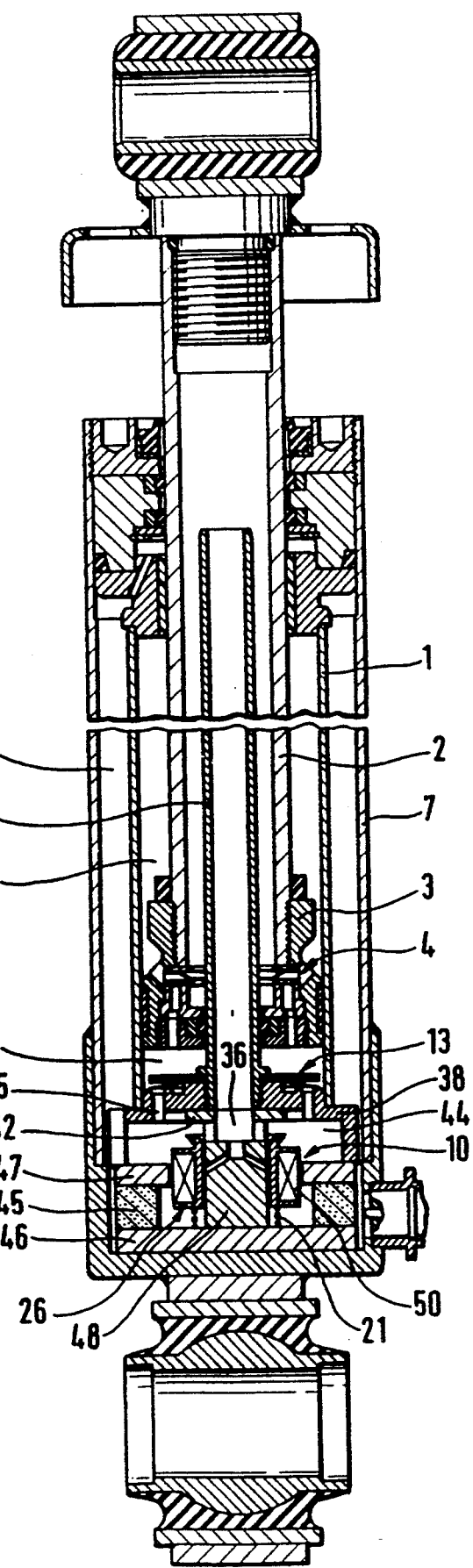
FIG. 1 is a partial cross-sectional view of a first preferred embodiment of a two-tube shock absorber with variable shock absorbing power according to the invention.
Figure 3:
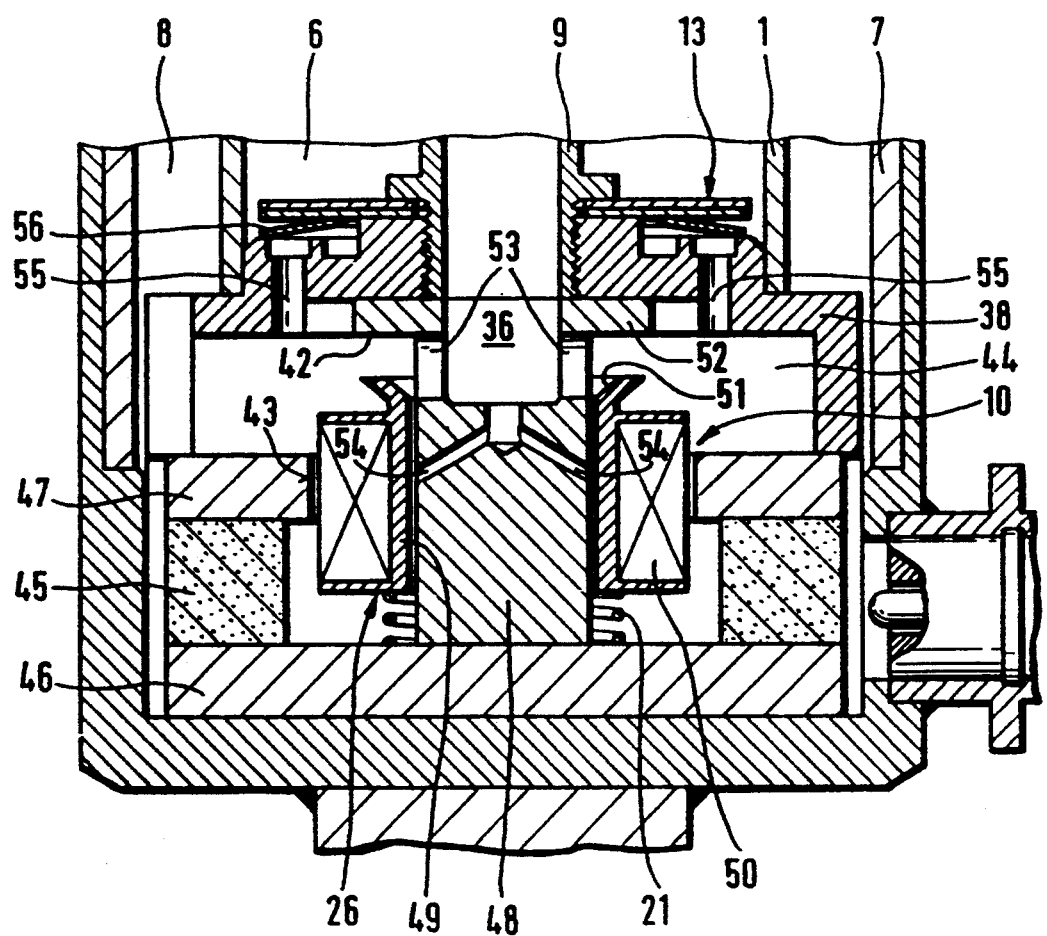
FIG. 3 shows the lower range of the two-tube shock absorber illustrated in FIG. 1 with a shock absorber valve in an upscaled cross-sectional representation.

A two-tube shock absorber according to this invention is shown in FIGS. 1 and 3. The shock absorber includes a hollow power cylinder 1 and an external tube 7 which is disposed coaxially with said power cylinder 1, so that a storage tank 8 having a ring-shaped cross section and being partly filled with oil is formed between power cylinder 1 and tube 7. The interior space of the power cylinder 1 is divided by a piston 3, being slidable by means of a tubular piston rod 2, into a first power chamber 5 being configurated above piston 3 and a second power chamber 6 being configurated beneath piston 3. Piston 3 is provided with a first non-return valve 4 whose function will be described below. In its central range piston 3 is penetrated by a central tube 9 which projects into the piston rod 2 and which affords a balance of volume between first power chamber 5 and second power chamber 8, on one hand, and between first power chamber 5 and storage tank 6, on the other hand, during the operation of the shock absorber. At the lower end of the central tube 9 a second non-return valve 13 and a shock absorber valve 10 are positioned. Valve 10 preferably has a single-stage configuration and serves for changing the cross-sectional area of flow of the connection between central tube 9 and storage tank 8. The second non-return valve 13 is constituted in this configuration by a disc-shaped element 38 which is arranged at the lower end of the power cylinder 1 and in which axially extending bores or ducts 55, are provided interacting with a spring plate 56 which renders possible their being opened or closed. Disc-shaped element 38 defines an annular hydraulic chamber 44 which is in connection with storage tank 8.

The shock absorber valve 10 is furnished with a cylindrical guide element 48 being axially abutted against disc-shaped element 38 with a radial collar 52, the lower annular surface of said collar 52 forming a sealing seat 42. The guide element 48 being formed in its upper part with a cylindrical recess 36 which is in connection with the interior space of the central tube 9 is furnished in this range with radial discharge openings 53 which afford a connection between the recess 36 and the hydraulic chamber 44; between the interior space of the central tube 9 and the storage tank 8.

Electromagnetically actuatable valve slide 49 is axially slidingly guided on guide element 48. Valve slide 49 interacts with sealing seat 42 and is provided with an inclined annular surface 51 being subject to the hydraulic pressure which exists within the interior space of the central tube. Valve slide 49 is preferably sleeve-shaped and serves simultaneously as a support of a winding 50 thereby forming a plunger coil 26 interacting with an axially polarized permanent magnet 45. Permanent magnet 45 is positioned between a baseplate 46 being abutted against the bottom of the shock absorber and a pole shoe 47 which is formed with an opening 43 accommodating plunger coil 26. In the embodiment illustrated in FIGS. 1 and 3 valve slide 49 is captivated to baseplate 46 by means of a spring 21 so that in its condition of rest it comes to assume a position in which the shock absorber valve 10 is partly open. The guide element 48 is furnished with lubricating bores 54 so that its surface, or the interstice between its surface and the valve slide 49, can be supplied with oil. Alternatively, spring 21 can be designed as a compression spring under whose prestressing action the valve slide 49 is in abutment against the sealing seat 42 and the discharge openings 53 are covered, so that the shock absorber valve 10 will be in the closed condition.

The axially polarized permanent magnet 45 generates a magnetic field of force whose lines of flux, being bundled by the pole shoe 47, penetrate the winding 50 of the plunger coil 26 and are closed by the guide element 48 and the baseplate 46. Through the annular surface 51 which is configurated at the upper end of the valve slide 49 the hydraulic pressure decreasing at the shock absorber valve 10 can influence the position of the valve slide 49 being adjusted by the spring 21 and the magnet drive 45, 50. By the shift of the valve slide 49 the discharge openings 53 will be partially covered, whereby the desired hydraulic resistance of said shock absorber valve 10 is adjusted. The equilibrium position of valve slide 49 for zero plunger coil current can be adjusted by countersprings (not shown) which counteract spring 21 and which will expediently be positioned outside of the illustrated plane of intersection between the discharge openings 53.

Figure 2:
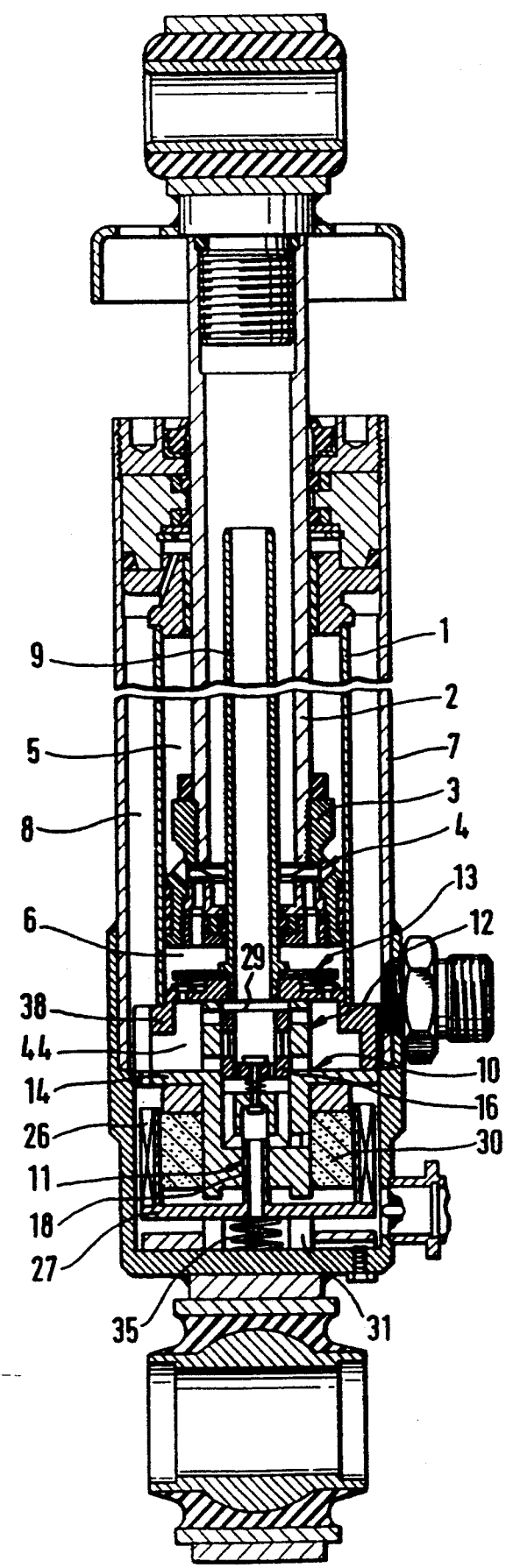
FIG. 2 is a partial cross-sectional view of a second embodiment of the invention in a sectioned representation corresponding to that in FIG. 1.
Figure 4:
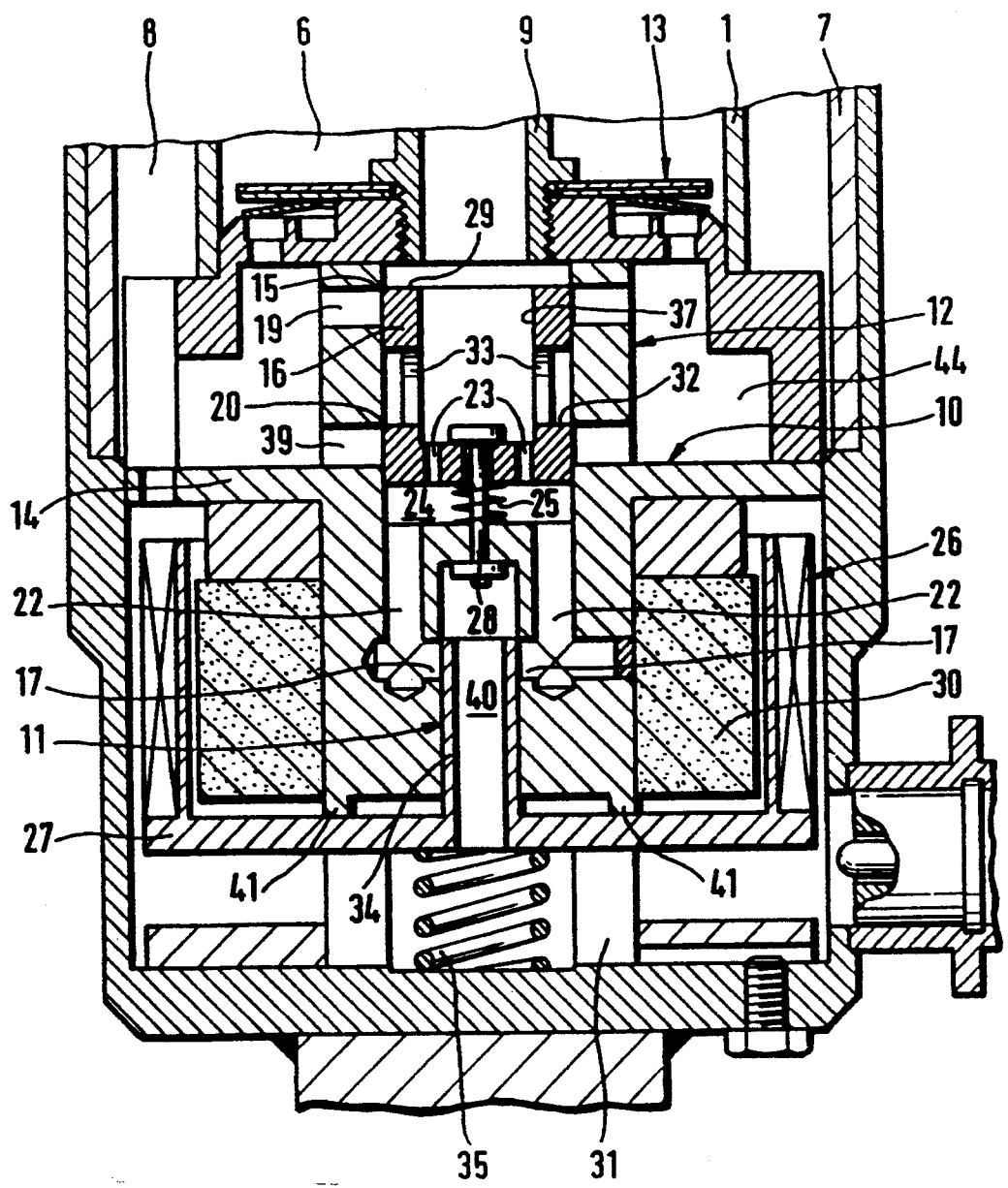
FIG. 4 shows the lower range of the two-tube shock absorber illustrated in FIG. 2 with a shock absorber valve in an upscaled cross-sectional representation.

In the embodiment illustrated in FIGS. 2 and 4, a two-stage shock absorber valve 10 includes an electromagnetically actuatable pilot control stage 11 and a main stage 12 whose position is influenced along by the pilot control stage 11 during operation.

The shock absorber valve 10 includes valve housing 14 which is axially abutted against the disc-shaped element 38 and which accommodates both the pilot control stage 11 and the main stage 12. Main stage 12 is preferably furnished with a main slide valve 16 which is slidingly guided within valve housing 14 and which is provided with two control edges 15, 20 interacting with flow-off bores 19, 39 which are configurated in valve housing 14 and which are in connection with storage tank 8. The upper control edge 15 is formed by the line of intersection of an annular surface 28 defining the main slide valve 16 with the latter's surface, whereas the second control edge 20 is constituted by the line of intersection of the lower flank of a radial annular groove 32 with the surface of the main slide valve 16. Main slide valve 16 is configurated open-type in its upper portion and is formed with a cylindrical recess 37. Uniformly distributed radial bores 33 are provided in the range of annular groove 32 which are brought into connection with the lower flow-off bores 39 in the event of opening of the main stage 12. In its position of rest the main slide valve 16 is positioned or captivated to the valve housing 14 under the action of a first compression spring 25 by means of a captivating element 28 in such a manner that flow-off bores 19, 39 come to be covered and the connection between the interior space of the central tube and the hydraulic chamber 44 and storage tank 8, respectively, is interrupted. Main slide valve 16 defines a hydraulic chamber 24 within valve housing 14 which is in connection with the interior space of the central tube 9 through restricting bores 23 which are provided in the bottom of the main slide valve. A plurality of uniformly distributed control ducts 22 end up in the hydraulic chamber 24 which are succeeded by radially extending control bores 17 interacting with an axially slidable control slide valve 18. Control slide valve 18 is actuatable by means of an electromagnetic actuating unit which plunger coil 26 and permanent magnet 30. Control slide valve 18 preferably is formed by an axial extension 34 of the plunger coil support 27 which is furnished with a passage 40 affording, in the event of the control bores 17 being opened up, a connection between hydraulic chamber 24 and hydraulic chamber 31 which is configurated beneath the electromagnetic actuating unit. Hydraulic chamber 31 is filled with oil and connected, in turn, with the storage tank 8. In the position of rest control slide valve 18 is prestressed by means of a compression spring 35 in the closing direction of the pilot control stage 11, so that the plunger coil support 27 comes to be abutted against axial projections 41 which are configurated at the valve body 14. The condition of rest of the shock absorber valve arrangement is illustrated in FIG. 4.

The position of rest of the pilot control stage 11 can be adjusted to a partially opened position by a counterspring to spring 35 (not shown) positioned between the coil support 27 and the valve housing 14.

Referring to FIG. 2, plunger coil 26 of the electromagnetic actuating unit is supplied with electric current to actuate the inventive two-tube shock absorber. The generated electromagnetic actuating power will bring about a movement of the control slide valve 18 in a downward direction (according to the drawing), so that a connection between the storage tank 8 and the interior space of the central tube 9 will be established. Now, when in the so-called traction stage the piston 3 moves upward, the pressure existing in the power chamber 5 will become higher than the pressure in the power chamber 5 which is positioned beneath the piston 3 while the first non-return valve 4 will remain closed. In this phase there will come about a displacement of the oil out of chamber 5 through the hollow piston rod 2 into the interior space of the central tube 9. The system pressure which is present at the main slide valve 16 while the pilot control stage 11 is open will bring about a partial or a complete opening of the main stage 12 because of the pressure differential which occurs between the interior space of the main slide valve 16 and the hydraulic chamber 24. As a result, the oil will flow through the annular chamber 44 and through bores or ducts 55, in the disc-shaped element 38 of the second non-return valve 13 into the power chamber 6 which is positioned below the piston 3 and which will simultaneously be refilled from the storage tank 8.

In the event of a movement of the piston 3 in a downward direction in the so-called thrust stage the pressure existing in the power chamber 6 which is positioned beneath the piston 3 will become higher than the pressure in the upper power chamber 5, so that the first non-return valve 4 will be opened.

The volumetric stream exiting from power chamber 6 will be divided effectively into a first part-stream which flows through the open first non-return valve 4 directly into the power chamber 5 being disposed above the piston 3, and into a second part-stream which passes through the hollow piston rod 2, through the central tube 9 and through the open shock absorber valve 10 into the storage tank 8.

Two modes of operation of the shock absorber valve 10 can be distinguished during operation of the inventive two-tube shock absorber. In the first mode of operation, which corresponds to a lower range of piston speed, in which low pressures and small volumetric streams will occur, the shock absorber valve 10 will work as a single-stage slide valve whose electromagnetic actuation determines the degree of opening of the pilot control stage 11.

In the second mode of operation, which corresponds to an upper range of piston speed, in which higher pressures and larger volumetric streams will occur, the control slide valve 18 will be positioned by energization of the plunger coil 26, exactly as in the first mode of operation. The position of control slide valve 18 is predetermined by an equilibrium between the force of the second compression spring 35, the actuating power of the plunger coil 26, and the hydrodynamic forces of flow occurring in the range of the mouth of the control bores 17. When control bores 17 are closed, the pressure existing below the main slide valve 16, respectively within the chamber 24, will equal the system pressure, so that the main stage 12 will remain closed by the force of the first compression spring 25. When the control bores are released, then a pressure differential will come about at the main slide valve 16 due to a flow of oil through the restricting bores 23 whose action on the main slide valve 16 will effect a force which overcomes the spring force of the first compression spring 25, so that a movement of the main slide valve 16 in a downward direction will take place and the control edges 15, 20, and the flow-off bores 19, 39 will be released. As a result of the flow-off of the oil being discharged from the central tube through the open flow-off bores 19, 39 the system pressure will be reduced sufficiently until a new equilibrium condition of the main slide valve 16 will come about which is essentially co-determined by the position of the control slide valve 18.

The actuating energy which is required for the movement of the main slide valve 16 will in this configuration be taken from the flow which has to be restricted. The shock absorber valve 10 will act as a two-stage pressure control valve in the upper range of operation, the electromagnetic actuation determining the level of the pressure differential at the main slide valve 16. In the lower range of operation the shock absorber valve 10 will, on the contrary, act as a throttle valve whose hydraulic permeability is predetermined on the basis of the actuation.

The continuous transition between the above-described ranges of operation in accordance with this invention can be modelled by proper dimensioning of the component parts and nearly optional families of characteristic curves can be generated as characteristics of the shock absorber valve. In particular, a smooth onset of the valve characterization in the lower range of operation becomes possible. This smooth onset corresponds to a comfort-accentuated shock absorber position when it is applied to controllable vehicle shock absorbers. In the upper range of operation the degressivity of the characteristic curves will essentially be determined by the cross-sectional area of the captivating element 28.

The preceding description is exemplary rather than limiting in nature. Modifications are possible that do not depart from the purview and spirit of this invention; the scope of which is limited only by the appended claims.

What is claimed is:

1. A two-tube shock absorber with controllable variable shock absorbing power for automotive vehicles, comprising:
    a power cylinder defined by a first tube having an interior space subdivided into first and second power chambers by means of a piston, said piston being slidable by a piston rod;
    a storage tank defined by a second tube surrounding the first tube and partly filled with oil;
    a first non-return valve disposed between the power chambers;
    a second non-return valve disposed between the second power chamber and the storage tank and having a disc-shaped element with hydraulic ducts hydraulically connecting the second power chamber with the storage tank and defining a sealing seat;
    a cylindrical guide element axially abutted against the disc-shaped element; and
    an electromagnetically actuable sleeve shaped valve slide defining an annular surface at an end and slidably disposed on the guide element and having a plunger coil fixed thereto operably interacting with an axially polarized permanent magnet fixed in position relative to the guide element for displacement between an open position wherein the annular surface is spaced from the sealing seat and a closed position wherein the annular surface is disposed against the sealing seat.

2. A two-tube shock absorber as recited in claim 1, wherein said permanent magnet is arranged between a pole shoe and a baseplate being abutted against a bottom of the shock absorber, said pole shoe being formed with an opening which accommodates said plunger coil, and having a spring disposed between the valve slide and the baseplate.

3. A two-tube shock absorber as recited in claim 2, wherein said valve slide is prestressed by said spring in the direction of said sealing seat so that said shock absorber valve is closed in a de-energized condition of said winding.

4. A two-tube shock absorber as recited in claim 2, wherein said valve slide is biased toward said base-plate by means of said spring so that said shock absorber valve is partly opened in a de-energized condition of said winding.

5. A two-tube shock absorber as recited in claim 1, wherein said guide element is furnished with lubricating bores.

* * * * *